US009626466B2

(12) United States Patent
Yang et al.

(10) Patent No.: US 9,626,466 B2
(45) Date of Patent: Apr. 18, 2017

(54) VARIABLE DISCRETIZATION METHOD FOR FLOW SIMULATION ON COMPLEX GEOLOGICAL MODELS

(75) Inventors: Yahan Yang, Pearland, TX (US); Linfeng Bi, Houston, TX (US); Weidong Guo, Houston, TX (US); Rossen Parashkevov, Houston, TX (US); Xiaohui Wu, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 762 days.

(21) Appl. No.: 13/825,758

(22) PCT Filed: Aug. 12, 2011

(86) PCT No.: PCT/US2011/047612
§ 371 (c)(1),
(2), (4) Date: Mar. 22, 2013

(87) PCT Pub. No.: WO2012/071090
PCT Pub. Date: May 31, 2012

(65) Prior Publication Data
US 2013/0231907 A1 Sep. 5, 2013

Related U.S. Application Data

(60) Provisional application No. 61/416,449, filed on Nov. 23, 2010.

(51) Int. Cl.
*G01V 99/00* (2009.01)
*G06F 17/50* (2006.01)

(52) U.S. Cl.
CPC ........ *G06F 17/5018* (2013.01); *G01V 99/005* (2013.01); *G06F 2217/16* (2013.01)

(58) Field of Classification Search
CPC .............. G01V 99/005; G06F 17/5018; G06F 2217/16
(Continued)

(56) References Cited

U.S. PATENT DOCUMENTS 5,740,342 A * 4/1998 Kocberber .............. G06T 17/05
345/420
5,844,799 A 12/1998 Joseph et al.
(Continued)

FOREIGN PATENT DOCUMENTS

CA 2900178 9/2016
EP 1653411 7/2008
(Continued)

OTHER PUBLICATIONS

Geiger, S., et al. "Combining Finite Element and Finite Volume Methods for Efficient Multiphase Flow Simulations in Highly Heterogeneous and Structurally Complex Geologic Media" Geofluids, vol. 4, pp. 284-299 (2004).*
(Continued)

*Primary Examiner* — Kamini S Shah
*Assistant Examiner* — Jay B Hann
(74) *Attorney, Agent, or Firm* — ExxonMobil Upstream Research Company-Law Department

(57) ABSTRACT

A variable discretization method for general multiphase flow simulation in a producing hydrocarbon reservoir. For subsurface regions for which a regular or Voronoi computational mesh is suitable, a finite difference/finite volume method ("FDM") is used to discretize numerical solution of the differential equations governing fluid flow (101). For subsurface regions with more complex geometries, a finite element method ("FEM") is used. The invention combines FDM and FEM in a single computational framework (102). Mathematical coupling at interfaces between different dis-
(Continued)

cretization regions is accomplished by decomposing individual phase velocity into an averaged component and a correction term. The averaged velocity component may be determined from pressure and averaged capillary pressure and other properties based on the discretization method employed, while the velocity correction term may be computed using a multipoint flux approximation type method, which may be reduced to two-point flux approximation for simple grid and permeability fields.

15 Claims, 6 Drawing Sheets

(58) Field of Classification Search
USPC .......................................................... 703/10
See application file for complete search history.

(56) References Cited

U.S. PATENT DOCUMENTS

| | | |
|---|---|---|
| 5,953,680 A | 9/1999 | Divies et al. |
| 6,106,561 A * | 8/2000 | Farmer .................. G01V 1/282 703/10 |
| 6,128,577 A | 10/2000 | Assa et al. |
| 6,138,076 A | 10/2000 | Graf et al. |
| 6,374,185 B1 | 4/2002 | Taner et al. |
| 6,549,854 B1 | 4/2003 | Malinverno et al. |
| 6,597,995 B1 | 7/2003 | Cornu et al. |
| 6,766,255 B2 | 7/2004 | Stone |
| 6,823,297 B2 | 11/2004 | Jenny et al. |
| 6,980,940 B1 * | 12/2005 | Gurpinar ................. E21B 43/00 703/10 |
| 7,043,367 B2 | 5/2006 | Granjeon |
| 7,069,149 B2 | 6/2006 | Goff et al. |
| 7,089,166 B2 | 8/2006 | Malthe-Sorenssen et al. |
| 7,177,764 B2 | 2/2007 | Stone |
| 7,225,324 B2 | 5/2007 | Huppenthal et al. |
| 7,363,163 B2 | 4/2008 | Le Ra Valec-Dupin et al. |
| 7,424,415 B2 | 9/2008 | Vassilev |
| 7,433,786 B2 | 10/2008 | Adams |
| 7,451,066 B2 | 11/2008 | Edwards et al. |
| 7,480,205 B2 | 1/2009 | Wei |
| 7,496,488 B2 | 2/2009 | Jenny et al. |
| 7,523,024 B2 | 4/2009 | Endres et al. |
| 7,526,418 B2 | 4/2009 | Pita et al. |
| 7,542,037 B2 | 6/2009 | Fremming |
| 7,546,229 B2 | 6/2009 | Jenny et al. |
| 7,596,480 B2 | 9/2009 | Fung et al. |
| 7,617,082 B2 | 11/2009 | Childs et al. |
| 7,620,800 B2 | 11/2009 | Huppenthal et al. |
| 7,706,981 B2 | 4/2010 | Wilkinson et al. |
| 7,711,532 B2 | 5/2010 | Dulac et al. |
| 7,742,875 B2 | 6/2010 | Li et al. |
| 7,756,694 B2 | 7/2010 | Graf et al. |
| 7,809,537 B2 | 10/2010 | Hemanthkumar et al. |
| 7,809,538 B2 | 10/2010 | Thomas |
| 7,860,654 B2 | 12/2010 | Stone |
| 7,904,248 B2 | 3/2011 | Li et al. |
| 7,925,481 B2 | 4/2011 | Van Wagoner et al. |
| 7,932,904 B2 | 4/2011 | Branets et al. |
| 7,933,750 B2 | 4/2011 | Morton et al. |
| 7,953,585 B2 | 5/2011 | Gurpinar et al. |
| 7,983,883 B2 * | 7/2011 | Chen ................... G06F 17/5018 703/10 |
| 7,986,319 B2 | 7/2011 | Dommisse et al. |
| 8,078,437 B2 | 12/2011 | Wu et al. |
| 8,117,019 B2 | 2/2012 | Sun et al. |
| 8,190,405 B2 | 5/2012 | Appleyard |
| 8,204,727 B2 | 6/2012 | Dean et al. |
| 8,212,814 B2 | 7/2012 | Branets et al. |
| 8,255,195 B2 | 8/2012 | Yogeswaren |
| 8,359,185 B2 | 1/2013 | Pita et al. |
| 8,370,121 B2 | 2/2013 | Sun et al. |
| 8,428,919 B2 | 4/2013 | Parashkevov |
| 8,433,551 B2 | 4/2013 | Fung et al. |
| 8,437,996 B2 | 5/2013 | Usadi et al. |
| 8,463,586 B2 | 6/2013 | Mezghani et al. |
| 8,489,375 B2 | 7/2013 | Omeragic et al. |
| 8,494,828 B2 | 7/2013 | Wu et al. |
| 8,583,411 B2 | 11/2013 | Fung |
| 8,594,986 B2 | 11/2013 | Lunati |
| 8,630,831 B2 | 1/2014 | Bratvedt et al. |
| 8,655,632 B2 | 2/2014 | Moguchaya |
| 8,694,261 B1 | 4/2014 | Robinson |
| 8,724,429 B2 | 5/2014 | Houck et al. |
| 8,776,895 B2 | 7/2014 | Li et al. |
| 8,805,660 B2 | 8/2014 | Güyagüler et al. |
| 8,818,778 B2 | 8/2014 | Salazar-Tio et al. |
| 8,818,780 B2 | 8/2014 | Calvert et al. |
| 8,825,461 B2 | 9/2014 | Sun et al. |
| 8,903,694 B2 | 12/2014 | Wallis et al. |
| 8,994,739 B2 | 3/2015 | Killough |
| 9,058,445 B2 * | 6/2015 | Usadi ................... G06F 17/5009 |
| 9,128,212 B2 | 9/2015 | Sun et al. |
| 9,187,984 B2 | 11/2015 | Usadi et al. |
| 9,372,943 B2 | 6/2016 | Li et al. |
| 2006/0122780 A1 | 6/2006 | Cohen et al. |
| 2008/0208539 A1 | 8/2008 | Lee et al. |
| 2009/0187391 A1 | 7/2009 | Wendt et al. |
| 2009/0281776 A1 * | 11/2009 | Cheng ................. G06F 17/5018 703/10 |
| 2009/0306945 A1 | 12/2009 | Wu et al. |
| 2010/0198638 A1 | 8/2010 | Deffenbaugh et al. |
| 2011/0015910 A1 | 1/2011 | Ran et al. |
| 2011/0054857 A1 | 3/2011 | Moguchaya |
| 2011/0115787 A1 | 5/2011 | Kadlec |
| 2011/0246154 A1 | 10/2011 | Koutsabeloulis et al. |
| 2011/0251830 A1 | 10/2011 | Hilliard et al. |
| 2012/0026167 A1 | 2/2012 | Ran et al. |
| 2012/0029828 A1 | 2/2012 | Pepper et al. |
| 2012/0158389 A1 | 6/2012 | Wu et al. |
| 2012/0215513 A1 | 8/2012 | Branets et al. |
| 2013/0030782 A1 | 1/2013 | Yogeswaren |
| 2013/0046524 A1 | 2/2013 | Gathogo et al. |
| 2013/0054201 A1 | 2/2013 | Gathogo et al. |
| 2013/0080128 A1 | 3/2013 | Yang et al. |
| 2013/0085730 A1 | 4/2013 | Shaw et al. |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110485 A1 | 5/2013 | Li et al. |
| 2013/0118736 A1 | 5/2013 | Usadi et al. |
| 2013/0166264 A1 | 6/2013 | Usadi et al. |
| 2013/0191091 A1 | 7/2013 | Fung et al. |
| 2013/0211800 A1 | 8/2013 | Fung |
| 2013/0226540 A1 | 8/2013 | Pita |
| 2013/0231907 A1 | 9/2013 | Yang et al. |
| 2013/0246028 A1 | 9/2013 | Hahn et al. |
| 2013/0246031 A1 | 9/2013 | Wu et al. |
| 2013/0275106 A1 | 10/2013 | Li et al. |
| 2014/0012557 A1 | 1/2014 | Tarman et al. |
| 2014/0039853 A1 | 2/2014 | Fung |
| 2014/0236559 A1 | 8/2014 | Fung et al. |
| 2014/0281743 A1 | 9/2014 | Hayder et al. |
| 2014/0303950 A1 | 10/2014 | Houeto et al. |
| 2014/0330547 A1 | 11/2014 | Calbert et al. |
| 2015/0227655 A1 | 8/2015 | Sun et al. |
| 2015/0293260 A1 | 10/2015 | Ghayour et al. |
| 2016/0035130 A1 | 2/2016 | Branets et al. |
| 2016/0124113 A1 | 5/2016 | Bi et al. |
| 2016/0124117 A1 | 5/2016 | Huang et al. |
| 2016/0125555 A1 | 5/2016 | Branets et al. |

FOREIGN PATENT DOCUMENTS

| | | |
|---|---|---|
| EP | 1707993 | 8/2009 |
| WO | WO 96/13788 | 5/1996 |
| WO | 1865343 | 12/2007 |
| WO | WO 2009/138290 | 11/2009 |
| WO | WO 2009/155274 | 12/2009 |
| WO | WO 2011/106135 | 9/2011 |
| WO | WO 2011/163166 | 12/2011 |
| WO | WO 2012/082128 | 6/2012 |

(56) References Cited

FOREIGN PATENT DOCUMENTS

| WO | WO 2013/028234 | 2/2013 |
|---|---|---|
| WO | WO 2013/187915 | 12/2013 |
| WO | WO 2014/168999 | 10/2014 |

OTHER PUBLICATIONS

Hoteit, Hussein & Firoozabadi, Abbas "Numerical Modeling of Two-Phase Flow in Heterogeneous Permeable Media with Different Capillarity Pressures" Advances in Water Resources, vol. 31, pp. 56-73 (2008).*
Nayagum, D., et al. "Modelling Two-Phase Incompressible Flow in Porous Media Using Mixed Hybrid and Discontinuous Finite Elements" Computational Geosciences, vol. 8, pp. 49-73 (2004).*
Klausen, R. & Winther, R. "Convergence of Multipoint Flux Approximation on Quadrilateral Grids" Numerical Methods for Partial Differential Equations, vol. 22, issue 6 (2006).*
Aavatsmark, Ivar "Multipoint Flux Approximation Methods for Quadrilateral Grids" 8th Int'l Forum on Reservoir Simulation (2007).*
Younes, A., et al. "Mixed Finite Elements for Solving 2D Diffusion-Type Equations" Reviews of Geophysics, vol. 48, (Mar. 2010).*
Aavatsmark, I. et al. (1996), "Discretization on non-orthogonal, quadrilateral grids for inhomogeneous, anisotropic media," *J. Comp. Phy.* 127, pp. 2-14.
Cai, Z. et al. (1997), "Control-volume mixed finite element methods," *Computational Geosciences* 1, pp. 289-315.
Chavent, G. et al. (1984), "Simulation of Two-Dimensional Waterflooding by Using Mixed Finite Elements," *SPE Journal*, pp. 382-390.
Chen, Q. et al. (2007), "A New Multipoint Flux Approximation for Reservoir Simulation," *SPE 106464, SPE Symposium on Reservoir Simulation*, 9 pgs.
Darlow, B.L. et al. (1994), Mixed Finite Element Method for Miscible Displacement Problems in Porous Media, *SPE Journal*, pp. 391-398.
Durlofsky, L.J. et al. (1993), "Development of a Mixed Finite-Element-Based Compositional Reservoir Simulator," SPE 25253, SPE Symposium on Reservoir Simulation, pp. 221-229.
Edwards, M. G. et al. (1994), "A Flux Continuous Scheme for the Full Tensor Pressure Equation," 4th European Conf. on the Mathematics of Oil Recovery, 15 pgs.

Ewing, R.E. et al. (1983), "Incorporation of Mixed Finite Element Methods in Compositional Simulation for Reduction of Numerical Dispersion," SPE 12267, SPE Symposium on Reservoir Simulation, pp. 341-347.
Fung, L.S.K. (1992), "Reservoir Simulation with a Control-Volume Finite-Element Method," *SPERE*, pp. 349-357.
Heinrich, B. (187), "Finite Difference Methods on Irregular Networks, A Generalized Approach To Second Order Elliptic Problems" Birkhauser, Basel, pp. 17-54.
Hoteit, H. et al. (2002), "Numerical Reliability for Mixed Methods Applied to Flow Problems in Porous Media," *Computational Geosciences* 6, pp. 161-194.
Hoteit, H. et al. (2006), Compositional Modeling By the Combined Discontinuous Galerkin and Mixed Methods, *SPE Journal*, pp. 19-34.
Klausen, R.A. (2004), "Relationships among some locally conservative discretization methods which handle discontinuous coefficients," *Computational Geosciences* 8, pp. 341-377.
Nordbotten, J.M. et al. (2005), "Discretization on Quadrilateral Grids with Improved Monotonicity Properties," *J. of Computational Physics* 203, pp. 744-760.
Verma, S.K. et al. (1977), "A Control Volume Scheme for Flexible Grids In Reservoir Simulation," SPE 37999, SPE Symposium on Reservoir Simulation, pp. 215-227.
Vohralik, M. (2004) "Equivalence Between Mixed Finite Element and Multi-Point Finite Volume Methods", *C.R. Acad. Sci. Paris Ser.* I 339, pp. 525-528.
Wheeler, M.F. et al. (1999), "A Parallel Multiblock/Multidomain Approach for Reservoir Simulation," SPE 51884, SPE Symposium on Reservoir Simulation, 11 pgs.
Wheeler, M.F. et al. (2006), "A Multipoint Flux Mixed Finite Element Method," *SIAM Journal on Numerical Analysis* 44, pp. 2082-2106.
Wu, X.H. et al. (2009), "Effect of Grid Deviation on Flow Solutions," *SPE Journal*, pp. 67-77.
Matthal, S.K., et al. (2007) "Finite Element-Node-Centered Finite-Volume Two-Phased-Flow Experiments With Fractured Rock Represented by Unstructured Rock Represented by Unstructured Hybrid-Element Meshes", *SPE Reservoir Evaluation & Engineering*, SPE 93341, Presented at the SPE Reservoir Simulation Symposium, The Woodlands, Texas Jan. 31-Feb. 2, pp. 740-756.
Wheeler, J.A., et al. (2002) "Enhanced velocity mixed finite element methods for flow in multiblock domains", *Computational Geosciences*, vol. 6, pp. 315-332.

\* cited by examiner

VARIABLE DISCRETIZATION METHOD FOR FLOW SIMULATION ON COMPLEX GEOLOGICAL MODELS

CROSS-REFERENCE TO RELATED APPLICATION

This application is the National Stage entry under 35 U.S.C. 371 of PCT/US2011/047612 that published as WO 2012/071090 and was filed on 12 Aug. 2011, which claims the benefit of U.S. Provisional Application No. 61/416,449, filed on 23 Nov. 2010, each of which is incorporated by reference, in its entirety, for all purposes.

FIELD OF THE INVENTION

This invention relates generally to the field of development of oil or gas fields, and more particularly to reservoir simulation. Specifically, the invention is a method for numerically solving fluid flow equations in complex subsurface geometries.

BACKGROUND OF THE INVENTION

Accurate prediction of flow behaviors in reservoirs is essential for effective reservoir management. Reservoir simulation is the use of a physical model of a reservoir on a computer to test how the reservoir will perform as production or stimulation proceeds over time, i.e. over a series of discrete time steps. The reservoir model is spatially discretized so that the differential equations governing fluid flow can be solved by numerical methods. Discretization methods commonly used today for reservoir simulation can be generally classified into one of two categories: finite difference/finite volume methods (FDM) or finite element methods (FEM). Of the different choices, each numerical method for solving differential equations on a computer has advantages and disadvantages. It is well-known that a finite difference method typically is simpler, easier to implement, and executes faster. For this reason, finite difference/finite volume methods are used widely in the industry today. Unfortunately, finite difference methods such as two-point flux approximation (TPFA) require Voronoi grids, where each cell boundary is perpendicular to the line joining centers of the two neighboring cells; see, for example, Heinrich. This is a severe limitation because building a Voronoi grid is challenging if not impossible when a reservoir model contains intersecting faults, pinchouts, or other irregular geological features. Finite element methods, on the other hand, are more complex mathematically, more difficult to implement, and take longer to execute. Because of this, finite element methods are not commonly used in reservoir simulation, even though they have the advantage of being applicable to models with flexible grids and using a general permeability tensor. Because of the implementation and efficiency issues associated with finite element and other alternatives, finite difference/finite volume methods such as TPFA are used in practice sometimes in situations where they should not, throwing into doubt the validity of simulation results.

While extensive studies exist in literature on mathematical theory of finite difference/finite volume methods for reservoir simulation, papers published on application of finite element methods to modeling general multiphase (gas or liquid) flow are limited. Most of the publications related to FEM methods have made simplifications either on fluid phase behavior, or simplifying treatments on gravitational or capillary effect. For example, Cai et al. proposed a new control-volume mixed finite element method for irregular block-centered quadrilateral grids and tested it on single phase flow problems. Hoteit et al. (2002) carried out analysis of mixed finite element and mixed-hybrid finite element methods for single phase problems. For multiphase flow, Fung et al. developed a control-volume finite-element method (CVFEM) for flow simulation to reduce grid-orientation effects. For CVFEM, mass conservation is honored on the dual grid. By comparison, a mixed finite element method (MFEM) offers a more natural way for achieving mass conservation, which is satisfied on the original grid. Chavent et al. used MFEM to simulate incompressible two-phase flow in two dimensions. MFEM was also used by Darlow et al. for solving miscible displacement problems and by Ewing and Heinemann for performing compositional simulation while neglecting gravity and capillary pressure. To improve accuracy, Durlofsky et al. developed a mixed finite element method for modeling three phase, multicomponent systems using IMPES type formulation. A similar MFEM approach was employed by Hoteit et al. (2006) in combination with discontinuous Galerkin to capture sharp saturation gradient. For parallel multiphysics and multiscale simulation, a multiblock/multidomain approach using mixed and expanded mixed methods and mortar space to handle nonmatching grids was proposed by Wheeler et al.

Besides FEM methods, the multipoint flux approximation (MPFA, see for example, Aavatsmark et al., Chen et al, Edwards et al.) has been developed to handle permeability tensor and flexible grids for reservoir simulation. It has been shown that with special choices of finite element spaces and the quadrature rule, MPFA may be derived from FEM methods.

SUMMARY OF THE INVENTION

In one embodiment, the invention is a method for simulating multi-phase flow in a producing hydrocarbon reservoir, comprising:

(a) generating a model of the reservoir made up of discrete cells;

(b) using a computer to numerically solve differential equations for pressure and for fluid saturation, by phase, for the reservoir, wherein:

(i) a finite element discretization method ("FEM") is used for the numerical solution in at least one region of the model, and a finite difference or finite volume discretization method (collectively, "FDM") is used for remaining regions of the model; and (ii) phase flow rate computation is made consistent in all regions and across interfaces between regions by decomposing each individual phase velocity into an averaged component and a correction term determined using MPFA type approaches; and (c) downloading, storing in memory or other data storage, or displaying at least one of hydrocarbon saturations, flow rates, and masses, for at least one phase, at one or more locations in the model.

It will be clear to persons who work in technical field that practical applications of the invention require use of a computer, programmed in accordance with the teachings of this disclosure. Thus, the invention is computer implemented.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
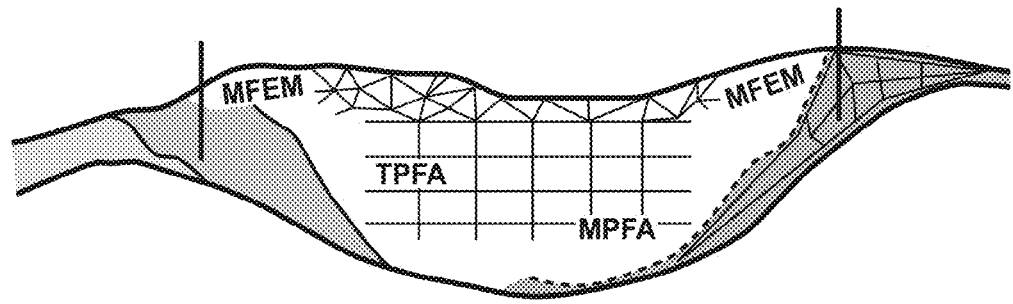
FIG. 1 is a schematic diagram of a reservoir model for flow simulation using a variable discretization method of the present invention.

The present invention combines finite difference and finite element methods in a single computational framework. The result is a variable discretization method for general multiphase flow simulation. The objective is to capture the strength and avoid the weakness of finite difference and finite element approaches. With this inventive variable discretization method, the reservoir may be divided into several regions and then different discretization methods are applied to different regions depending on the geometry and permeability properties there. For example, for regions containing intersecting faults or lying near an internal surface, a mixed finite element method or a control volume finite element method may be applied after a flexible computational mesh is created; see FIG. 1. For the bulk of the reservoir away from the geological complexities, a structured or Voronoi grid may be constructed and a simpler multipoint flux approximation or a two point flux approximation may be employed instead.

An important aspect of the present invention's variable discretization method is to establish a consistent formulation for multiphase flow simulation and the mathematical coupling at interfaces between different discretization regions. For different discretization methods, the type of variables and the form of equations for determining flow velocity are different. In addition, different phases usually have different capillary and gravitational forces acting on them. It is thus important to have a consistent method for the computation of flow rates for all phases. Consistency is achieved in the present invention through a new technique which decomposes individual phase velocity into an averaged component and a correction term. The averaged velocity component is determined from pressure, i.e. the ambient pressure, and averaged capillary pressure and other properties based on the discretization method employed. The velocity correction term is computed using an MPFA type method, which is applicable for structured or unstructured grids, with scalar or tensorial permeability fields. This method of deriving phase velocity is thus different from the previous methods, for example, the method of Durlofsky et al., where a total velocity is first defined for each cell based on cell permeability and relative permeability values, and then phase velocity for each edge is computed using upwinding and averaging from two elements sharing the edge (face).

The method disclosed herein for computing velocity also plays an important role in establishing the coupling between regions using different discretization methods. Physically, different regions are coupled together by flow. The coupling method ensures that a consistent velocity is obtained for the interface separating regions where grid geometry and permeability properties potentially may be substantially different. Herein, consistency means not only that velocity is continuous across the interface, but also that the method is consistent as well, i.e. uses the same formulas in all steps for pressure and saturation solves to compute the same physical quantity.

The present invention's variable discretization method may be combined with different formulation methods, e.g., IMPES (implicit pressure and explicit saturations), sequential implicit, IMPSAT (implicit pressure and saturations), or coupled implicit, to solve the coupled multiphase flow problem. To illustrate this, a sequential implicit method is adapted next to solve pressure and saturation equations (once for each time step). Due to the rigorous treatment for phase velocity, consistent forms of flow expressions are employed in each step to minimize errors and improve stability for flow simulation. By taking advantage of the consistency and similarities in the computational flows, the present method for multiphase flow calculations also improves efficiency and facilitates code implementation for combining finite difference and finite element methods in a single computational framework.

1. Consistent Velocity Calculations for Multiphase Flow

Pressure solve, i.e. solution for pressure for multiphase flow simulation, is based on a combination of a mixed finite-element method, a control volume finite element, a multipoint flux approximation and a two point flux approximation. The advantage of using a mixed finite-element method is that the method can handle complex reservoir geometry and internal geological features such as faults and pinchouts. The mixed finite element method also can work with very general permeability and flexible computational meshes, in addition to honoring mass conservation. In this section, the well-known mixed finite element method for single phase, incompressible flow is first described. After that, the method is generalized to multiphase systems, accounting for phase equilibrium, compressibility, capillary pressure, and gravity. The new derivation of this embodiment of the invention computes phase velocity by defining a phase absolute velocity which in its basic form involves absolute permeability only. Phase absolute velocity is derived as the sum of an averaged velocity which is solved using MFEM and a local correction term determined using modified MPFA method. Extension of MPFA as a discretization method for multiphase flow follows a similar pattern and is also presented.

1.1 MFEM for Single Phase Flow

A mixed finite element method for single phase flow solves the mass conservation equation and Darcy's law $$\begin{cases} \nabla \cdot u = f \\ K^{-1}u + \nabla p = 0 \end{cases} \tag{1}$$

where u is fluid velocity, p is pressure, and f is a source/sink term. For simplicity, the lowest order Raviart-Thomas spaces RT0 are used. First, Eq. (1) can be rewritten in weak form as $$\int_E \nabla \cdot u dx = \sum_{s=1}^{\tau} u_s |\Gamma_s| = f_E \cdot |E| \tag{2}$$

and $$\int_E (K^{-1}u) \cdot v dx - p_E \cdot \sum_{s=1}^{\tau} v_s \cdot |\Gamma_s| + \sum_{s=1}^{\tau} p_s \cdot v_s \cdot |\Gamma_s| = 0 \tag{3}$$

where |E| and |Γ| are volume and face area for cell E, v is velocity test function, and $f_E$, $p_E$, $p_s$, $u_s$, and $v_s$ are cell averaged source/sink term, cell averaged pressure, face averaged pressure, face velocity, and face averaged test velocity, respectively, and the sum over s is a sum over all faces of the cell E. To construct the linear system, face velocity is first expressed in terms of $p_E$ and $p_s$ by inverting a local mass matrix $M_E$, which is defined by the following $$(M_E \bar{u}, \bar{v}) = \int_E (K^{-1}u) \cdot v dx \tag{4}$$

Imposing continuity on velocity across each internal face then results in equations involving system unknowns $p_E$ and $p_s$ only. The final step is to solve $p_E$ and $p_s$ by coupling velocity continuity equations with mass conservation, Eq. (2).

1.2 MFEM for Multiphase Flow

The mixed finite-element method described above may be generalized to handle multiphase flow, accounting for phase equilibrium, compressibility, capillary and gravitational effects. The idea is to replace mass conservation with a volume balance equation for multiphase flow. In deriving the volume balance equation, phase velocity and flow rates are computed using a new method that computes phase flow rates from phase absolute velocity. Phase absolute velocity is in turn defined as sum of an averaged absolute velocity and a correction term determined using a modified MPFA method.

This approach has the advantage that the same forms of expressions for phase flow can be written for pressure solve and transport solve to make the two steps consistent with each other. With sequential implicit method, some volume discrepancy error is expected due to the fact that the equations are not solved simultaneously, flow relations are non-linear, and other reasons. This consistent approach for flow calculations, together with conservation of total velocity imposed during the saturation solve, reduces the errors in phase volume balance, which is important for time step stability of flow simulation.

The absolute velocity $u_a$ accounting for averaged capillary and gravity effects is defined as the solution to the following:

$$K^{-1}u_a + \nabla(p + p_{c,a}) + \rho_a g \vec{z} = 0 \tag{5}$$

where $\vec{z}$ is the unit vector in z-direction. The corresponding equation in weak form is $$\int_E (K^{-1}u) \cdot v dx - p_E \cdot \sum_{s=1}^{\tau} v_s \cdot |\Gamma_s| + \sum_{s=1}^{\tau} p_s \cdot v_s \cdot |\Gamma_s| = \tag{6}$$

$$p_{c,a,E} \cdot \sum_{s=1}^{\tau} v_s \cdot |\Gamma_s| - \sum_{s=1}^{\tau} p_{c,a,s} \cdot v_s \cdot |\Gamma_s| +$$

$$\rho_a g \left( z_E \cdot \sum_{s=1}^{\tau} v_s \cdot |\Gamma_s| - \sum_{s=1}^{\tau} z_s \cdot v_s \cdot |\Gamma_s| \right)$$

The face average value of capillary pressure, $p_{c,a,s}$, may be obtained by interpolating on capillary pressures for cells. Note that $p_s$ and $p_{c,a,s}$ may be combined in Eq. (6), only the sum of the two terms and not the individual value of $p_{c,a,s}$ impacts the flow solutions. Similar to MFEM for single phase flow, $u_a$ may be expressed in terms of $p_E$ and $p_s$ using the mass matrix and Eq. (6).

Note that relative permeability is not explicitly involved in the equations (5-6) for averaged velocity. This makes the method more efficient because it means the mass matrices are independent of time and so the associated computation (inversion) needs to be performed only once for each cell at the beginning of simulation.

Figure 2:
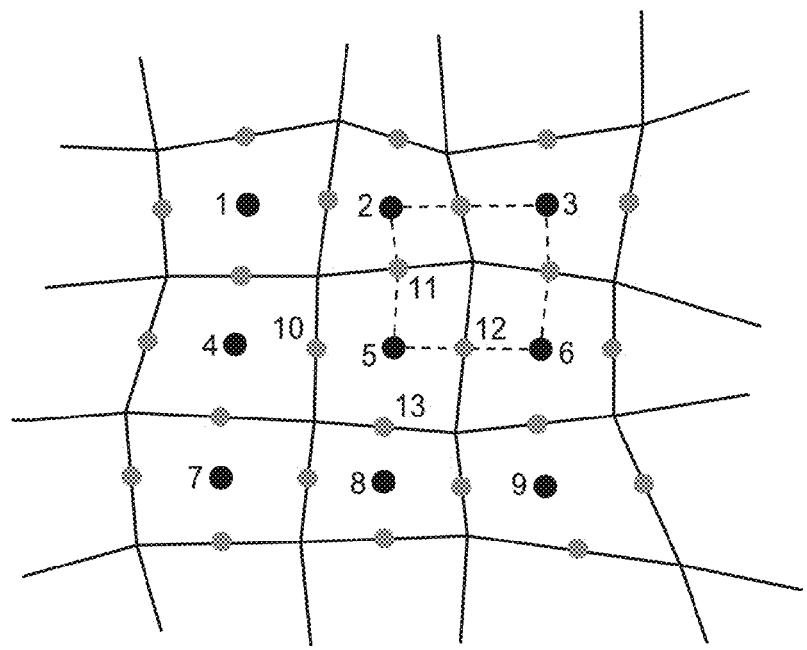
FIG. 2 is a schematic diagram of a computational grid for MFEM discretization and locations of pressure unknowns in the present inventive method.

In order to obtain phase velocity at each cell face, a correction term to the averaged absolute velocity for capillary and gravity effect, $\delta u_v$, needs to be computed. For that purpose, the multipoint flux approximation method is modified and applied to each interaction region (dashed box in FIG. 2) set up around each grid vertex point. FIG. 2 is a schematic diagram of a computational grid for MFEM discretization. Black dots symbolize cell pressure unknowns, while grey dots stand for face pressure unknowns. The box with broken lines is an example interaction region.

With the modified multipoint flux approximation, a linear pressure function, $\delta p_v$, is sought for each sub-interaction region belonging to a grid cell such that the following conditions are satisfied (see FIG. 3), 1. At cell centers, $\delta p_v = p_{c,v} - p_{c,a}$ where both phase capillary pressure and averaged capillary pressure may have different values for different sub-interaction regions;
2. $\delta p_v$ is continuous at face centers;

3. Velocity correction for each sub-face contained within the interaction region, $\delta u_v = -K \cdot [\nabla \delta p_v + (\rho_v - \rho_a) g \vec{z}]$ evaluated on each sub-interaction region, is continuous in normal direction across the face. Note in this equation both phase density and averaged density may have different values for different sub-interaction regions.

Figure 3:
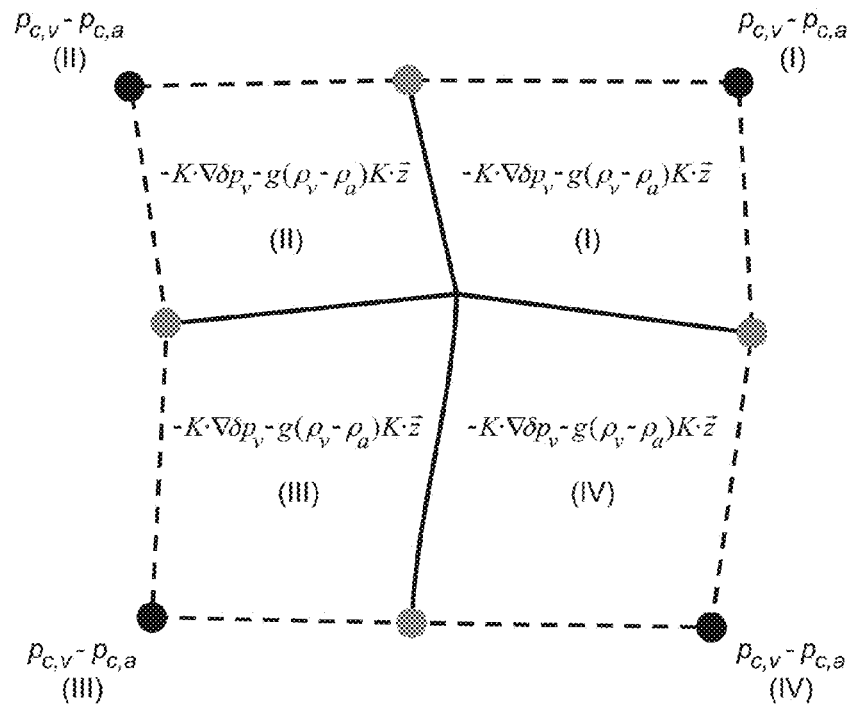
FIG. 3 is a schematic of a 2D MPFA interaction region (such as the example interaction region shown in FIG. 2) with four sub-interaction regions shown for computing phase velocity corrections for MFEM, where black dots and grey dots are locations of primary pressure unknowns and intermediate pressure unknowns, respectively.

FIG. 3 is a schematic diagram of a 2D MPFA interaction region, showing constrained values and a velocity expression for each sub-region for determining the velocity correction term. Black dots indicate locations where values of linear pressure interpolations are constrained, i.e. the value of $\delta p_v$ must be equal to $p_{c,v} - p_{c,a}$. The grey dots indicate positions where MPFA intermediate unknowns are located. The velocity correction term for a whole face may be obtained by combining corresponding sub-face correction terms obtained on two neighboring interaction regions.

The use of an MPFA method here has advantages over simple averaging in that MPFA calculations are local and results are consistent with the grid geometry and prescribed permeability field. Simple averaging, on the other hand, may yield an unrealistic phase velocity such as non-zero flow rate when there should not be any flow due to blockage in flow path. Finally, phase absolute velocity is defined as $$u_v = u_a + \delta u_v \quad (7)$$

Equations for phase flow rate and mass flow rate then follow $$F_v = |\Gamma| \lambda_v(S) u_v \quad (8)$$

$$U_i = \sum_{v=1}^{w} \xi_{iv} |\Gamma| \lambda_v(S) u_v \quad (9)$$

where component phase density $\zeta_{iv}$, and phase saturation S are obtained from fluid property calculations. Mobility $\lambda_v(S)$ in Eqs. (8-9) may be determined using a displacement model. For stability, phase mobility is 100% upstream weighted. Eqs. (7-9) may be regarded as a natural generalization of the corresponding equations for TPFA, where phase flow rate is written as product of $|\Gamma|\lambda_v(S)$ and a velocity term computed based on potential difference between two neighboring cells and absolute permeability. There are two implications of this observation. First, this method preserves the hyperbolic character of the transport equations so the system is amenable to efficient solution methods when capillary pressure is neglected and upwinding is applied. Second, similarity in flow expressions for TPFA, MFEM and other methods makes it easier to establish a common computational framework in the simulator for performing different discretization calculations.

Using Eqs. (7-9), the counterpart of mass conservation for multiphase flow may be derived using volume balance equation, which states that at any point in the reservoir, fluid fills the entire pore volume, or $$v_t = v_p \quad (10)$$

Linearizing Eq. (10) and using Eq. (9) leads to the following $$\left[ \frac{\partial v_t}{\partial p} + dt \sum_{s=1}^{\tau} \sum_{i=1}^{m} \left( \frac{\partial v_t}{\partial N_i} \cdot \frac{\partial U_{s,i}}{\partial p} \right) - \frac{\partial v_p}{\partial p} \right] (p_E - p_E^0) = $$

$$v_p^0 - v_t^0 - \sum_{s=1}^{\tau} \sum_{i=1}^{m} \frac{\partial v_t}{\partial N_i} dt \cdot U_{s,i}^0 \quad (11)$$

where superscript $^0$ indicates a beginning of time step value, and dt is time step size. Fluid volume and derivatives in the equation above are again taken from fluid property calculations. The system of equations to solve for $p_E$ and $p_s$ are obtained by imposing velocity continuity on $u_a$ and then combining the resulting equations with Eq. (11). Assuming saturation values are fixed, cell averaged pressure and face averaged pressure can be solved. Afterwards, absolute velocity $u_a$, phase velocity $u_v$, and mass flow rate $U_i$ can be recovered using Eqs. (6), (7), and (9).

1.3 MPFA for Multiphase Flow

MPFA has been proposed for irregular grids. It can also handle general permeability fields. Conceptually, pressure interpolation in MPFA is not completely self-consistent in that different values for pressure at the same intermediate unknown location may be produced depending on the interaction region being processed. The attractive aspect of MPFA, though, is that the method uses fewer system unknown variables and so may be less expensive compared to MFEM. In terms of computational procedure, MPFA is different from MFEM mainly in the way face velocity is derived and used, and this difference has very significant mathematical consequences.

For MPFA calculations, interaction regions need to be set up first around the vertex points. There are two different methods to derive phase velocity expressions for MPFA. With the first method, the procedure is similar to that for MFEM. First, an average velocity is computed corresponding to values of cell pressure, averaged capillary pressure, and averaged density. For that purpose, a linear pressure function, $p_a$, is sought for each sub-interaction region belonging to a grid cell (see FIG. 4) such that 1. At cell centers, $p_a = p + p_{c,a}$ where averaged capillary pressure may have different values for different sub-interaction;
2. $p_a$ is continuous at face centers;
3. Average velocity for each sub-face contained within the interaction region, $u_a = -K \cdot [\nabla p_a + \rho_a g \vec{z}]$ evaluated on each sub-interaction region, is continuous in the normal direction across the face. Note that averaged density in this computation may have different values for different sub-interaction regions.

Figure 4:
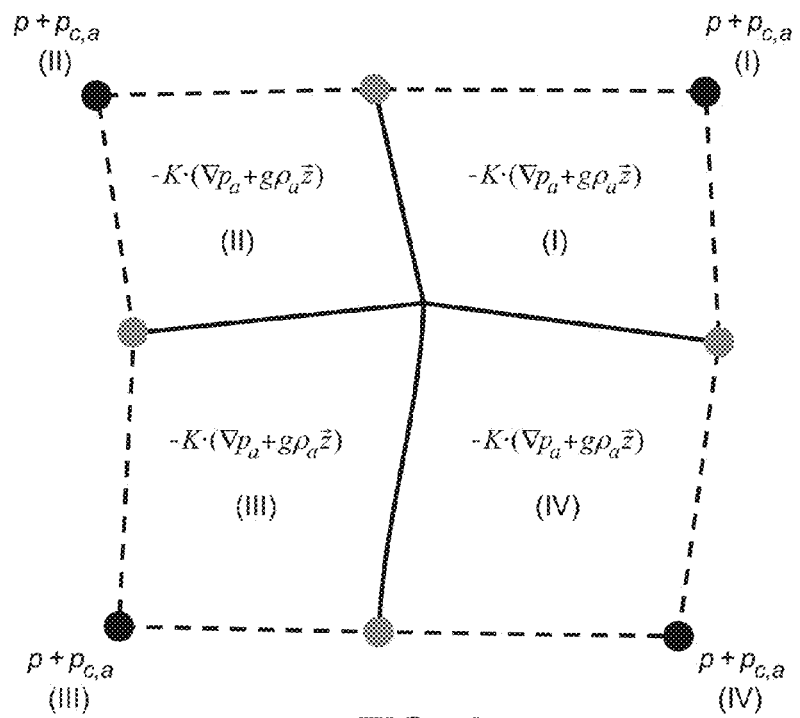
FIG. 4 is a schematic diagram of a 2D MPFA interaction region for computing averaged velocity for MPFA discretization method, where black dots and grey dots are locations of primary pressure unknowns and intermediate pressure unknowns, respectively.

FIG. 4 is a schematic diagram of a 2D MPFA interaction region, with the black dots showing locations where values of linear pressure interpolations are constrained, and showing a velocity expression for each sub-region for determining MPFA averaged velocity. Grey dots indicate positions where MPFA intermediate unknowns are located.

Similar to the treatment for MFEM, a velocity correction term, $\delta u_v$, is computed for each phase. The phase absolute velocity u, may then be obtained by combining $u_a$ and $\delta u_v$ for the sub-faces.

In the aforementioned second way of deriving phase velocity expressions for MPFA, phase velocity is computed directly without the use of an averaged velocity. To accomplish that, MPFA is modified so as to seek a linear pressure function, $p_v$, for each sub-interaction region belonging to a grid cell (see FIG. 5) such that:

1. $p_v = p + p_{c,v}$ at cell centers;
2. $p_v$ is continuous at face centers;
3. Phase velocity for each sub-face contained within the interaction region, $u_v = -K \cdot [\nabla p_v + \rho_v g \vec{z}]$ evaluated on each sub-interaction region, is continuous in the normal direction across the face. Note in this equation phase density may have different values for different sub-interaction regions.

Figure 5:
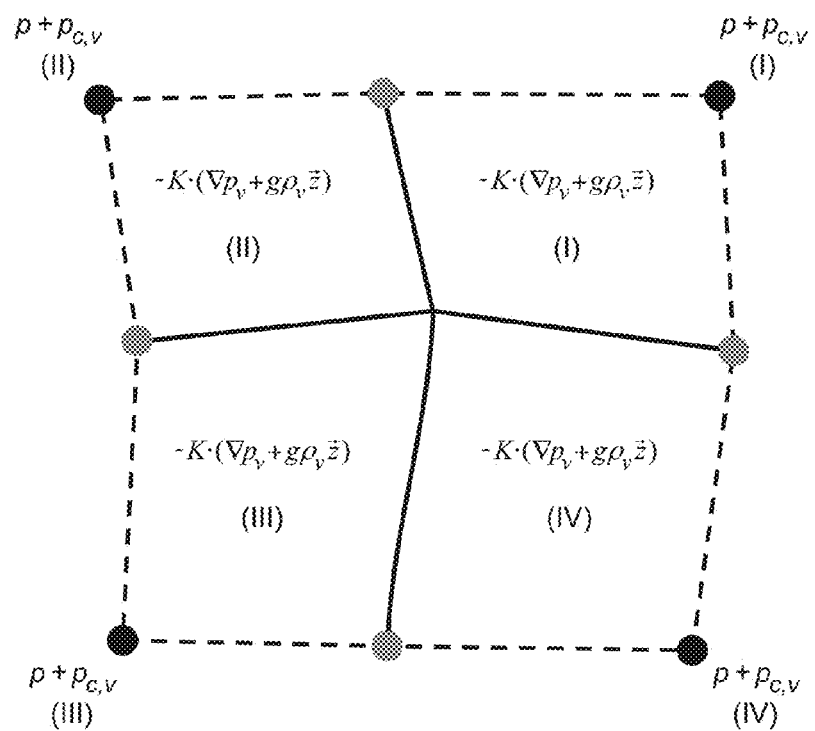
FIG. 5 is a schematic diagram of a 2D MPFA interaction region for computing individual phase absolute velocity for MPFA discretization method, where black dots and grey dots are locations of primary pressure unknowns and intermediate pressure unknowns, respectively.

FIG. 5 is a schematic diagram of a 2D MPFA interaction region, with black dots indicating locations where values of pressure are constrained for linear interpolations, and showing an expression for velocity for each sub-region for determining MPFA phase velocity. Grey dots indicate positions where MPFA intermediate unknowns are located.

After $u_v$ is solved for at the sub-faces, phase absolute velocity for the face may then be obtained by combining those for the sub-faces.

These two methods of deriving phase absolute velocity may appear to be very different. Fortunately, final results are actually the same because both procedures are linear, i.e., phase absolute velocity is a linear function of constrained values at cell centers and density terms in the velocity expressions. By adding values of cell center constraints and density terms for deriving $u_a$ and $\delta u_v$, it is obvious that superposition of the MPFA pressure interpolation for averaged absolute velocity and the correction term becomes pressure interpolation for the second method, and, consequently, the two procedures are equivalent. This is an important fact because it provides additional theoretical basis for the decomposition of phase velocity which is necessary for MFEM.

In performing MFEM or MPFA calculations, the averaged capillary pressure and density preferably should be taken as proper averages of the respective variable weighted by saturations, mobility, etc. Depending on the exact form of the weighting scheme, relative permeability may enter indirectly the calculations for absolute velocity. To reduce complexity of code development, however, these averages may be set to zero, provided that necessary checking is in place to ensure the accuracy of solutions.

2. Variable Discretization

With variable discretization, different discretization methods described above as well as traditional approaches such as TPFA and CVFEM are combined to solve the pressure equation. In solving for the pressure solution, the reservoir may be divided into different regions for which a different discretization method, MFEM, CVFEM, MPFA, or TPFA, may be assigned. In a simulation model, those regions potentially may have substantially different grid geometry and permeability properties. Generally, MFEM is preferable where grids are non-matching, severely distorted, or the permeability field is highly discontinuous. For regions where distortion to the grid is mild and the permeability field is relatively smooth, MPFA or CVFEM may be applied. To reduce the error, use of TPFA should preferably be restricted to areas where the grid is either structured or Voronoi and permeability is either scalar or a diagonal tensor.

For cells away from the interfaces between regions, the methods described in the previous section are used to generate the linear system to solve for pressure unknowns. For cells at the interfaces, coupling between neighboring regions needs to be established so that calculations of flow are consistent and mass balance is honored. In doing that, velocity derivations presented earlier provide a convenient way to construct coupling equations for different combinations of discretization methods.

2.1 Interface between MFEM and MPFA

For each interface dividing a MFEM region and a MPFA region, there is no change to the MFEM and MPFA calculations except for the equation for the continuity of velocity for cell faces on the interface. On such faces, it is required that averaged absolute velocity derived based on Eq. (6) for the MFEM side is the same as that derived for the other side using MPFA procedure.

Figure 6:
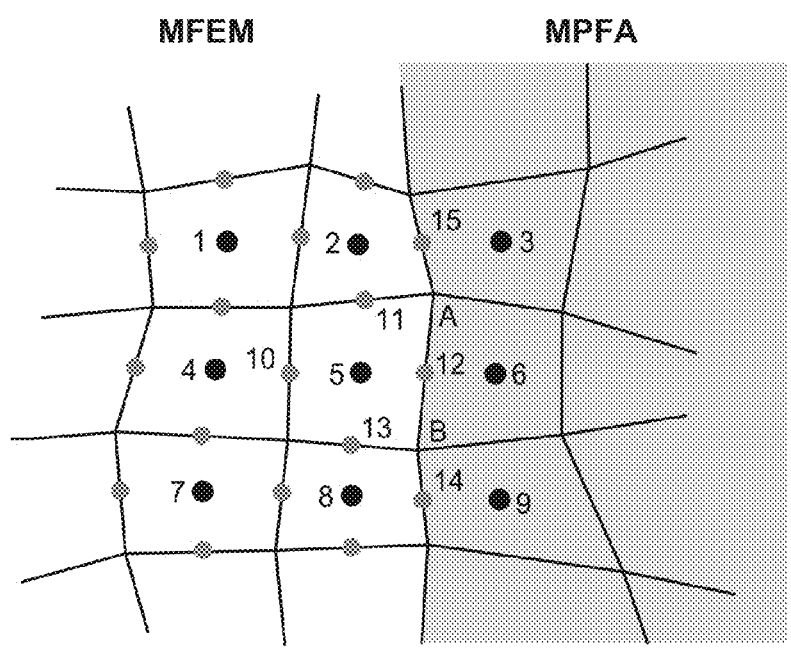
FIG. 6 is a schematic diagram showing a computational region using MFEM discretization method and a computational region using MPFA discretization method, where black dots and grey dots symbolize cell pressure unknowns and face pressure unknowns, respectively.

Consider the 2D model in FIG. 6 as an example. FIG. 6 is a schematic diagram of a computational region using a MFEM discretization method and a computational region using a MPFA discretization method. Black dots symbolize cell pressure unknowns, while grey dots indicate face pressure unknowns. Continuity of absolute velocity for edge AB takes the form $$u_{a,MFEM}(p_5,p_{10},p_{11},p_{12},p_{13})=u_{a,MPFA}(p_2,p_3,p_5,p_6,p_8,p_9) \quad (12)$$

Above, MPFA velocity for side AB is derived based on interaction regions around vertex A and vertex B and so involves cell center pressures $p_2$, $p_3$, $p_5$, $p_6$, $p_8$, and $p_9$. Alternatively, MPFA linear pressure interpolation may make use of side averaged pressure values, $p_{12}$, $p_{14}$, and $p_{15}$, which leads to an expression of velocity as a function of pressures $p_{15}$, $p_3$, $p_{12}$, $p_6$, $p_{14}$, and $p_9$. Though both approaches produce a consistent flow field, the former uses the same MPFA procedure as that for cells away from the interface, and so may require less implementation effort.

2.2 Interface between MFEM and TPFA

Similar to the treatment for MFEM and MPFA, there is no change to the MFEM and TPFA calculations except for the equation for the continuity of velocity for cell faces on the interface. For such faces, it is required that averaged absolute velocity derived based on Eq. (6) for the side using MFEM is the same as that derived based on TPFA method for the other side. Since the cell on the MFEM side may have quite irregular cell geometries and a general form of permeability tensor and so TPFA may not be appropriate, it is desirable to limit TPFA discretization so it does not extend beyond the interface. For that reason, TPFA velocity on any cell face belonging to the interface is preferably computed from face pressure and cell pressure on the TPFA side, rather than two neighboring cell pressures. For the 2D example in FIG. 7, the velocity continuity equation for edge AB takes the form $$u_{a,MFEM}(p_5,p_{10},p_{11},p_{12},p_{13})=u_{a,TPFA}(p_{12},p_6) \quad (13)$$

Figure 7:
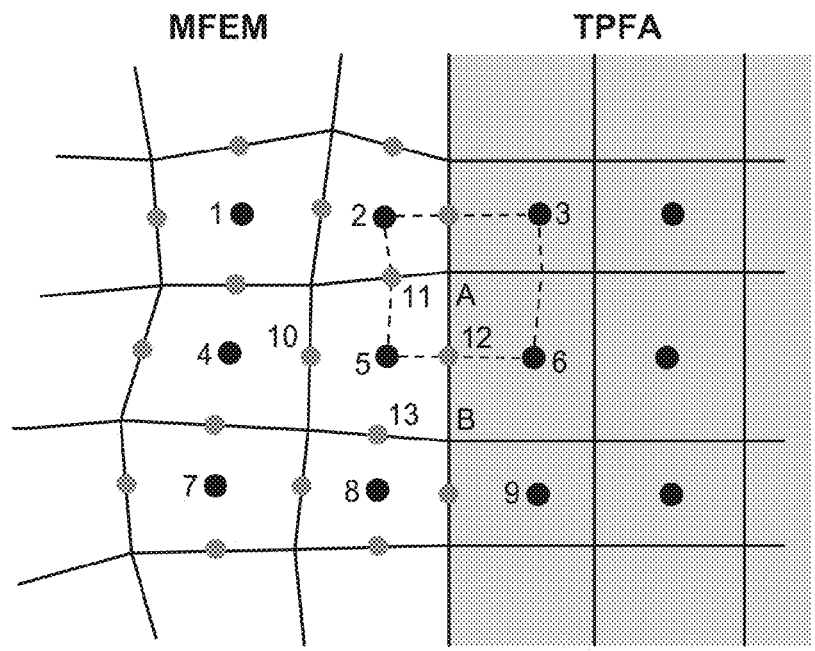
FIG. 7 is a schematic diagram of a computational region using MFEM discretization method and a computational region using TPFA discretization method, where black dots and grey dots symbolize cell pressure unknowns and face pressure unknowns, respectively.

FIG. 7 is a schematic diagram of a computational region using an MFEM discretization method and a computational region using a TPFA discretization method. Black dots symbolize cell pressure unknowns, while grey dots indicate face pressure unknowns.

2.3 Interface Between MPFA and TPFA

For cells in MPFA and TPFA regions, cell center pressures are the only unknowns. For cell faces at the interface between the two regions, values of velocity computed from the two sides may in general be different. To eliminate ambiguity, the velocity value derived from MPFA may be set to be the face velocity for the purpose of flow calculations. This is because MPFA has a wider range of applicability than TPFA and so may result in a smaller discretization error in general. For the 2D example in FIG. 8, velocity continuity for edge AB is obtained simply by setting $$u_{a,AB}=u_{a,MPFA}(p_2,p_3,p_5,p_6,p_8,p_9) \quad (14)$$

Figure 8:
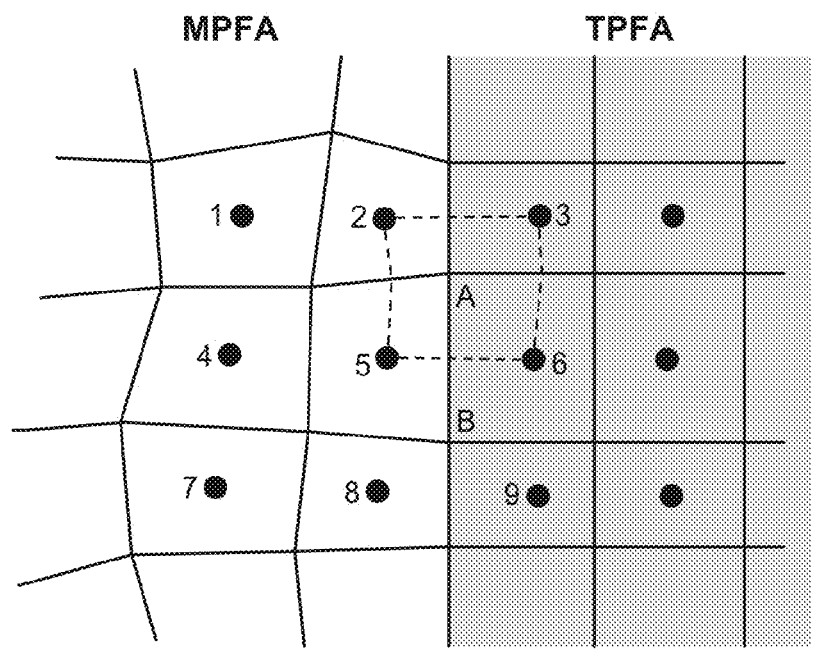
FIG. 8 is a schematic diagram of a computational region using MPFA discretization method and a computational region using TPFA discretization method, where black dots symbolize cell pressure unknowns.

In FIG. 8, the black dots symbolize cell pressure unknowns.

2.4 Interface between CVFEM and MFEM

Figure 9:
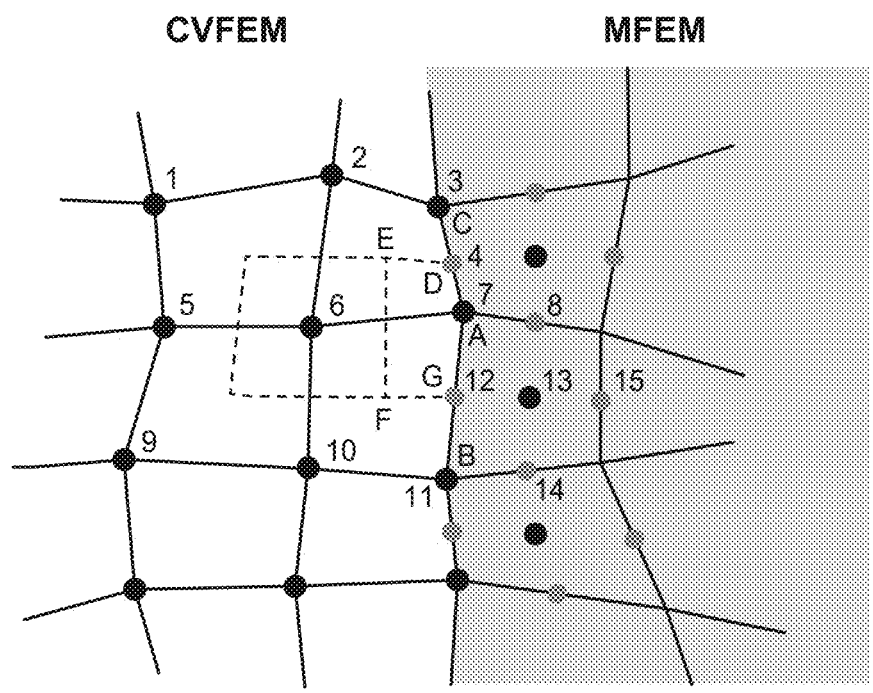
FIG. 9 is a schematic diagram of a computational region using a CVFEM discretization method and a computational region using an MFEM discretization method, where black dots symbolize cell or node pressure unknowns, while grey dots indicate face pressure unknowns.

Another option to deal with irregular grids or tensorial permeability field is CVFEM discretization method. CVFEM is less expensive compared to MFEM, but does not handle permeability discontinuities as accurately. For example, with a checker board permeability field, CVFEM may predict non-zero flow rate even when permeability jumps between a zero and a non-zero value. In the simulation, CVFEM should preferably be applied to regions where permeability jumps are not very large. For CVFEM discretization, unknowns are node (vertex) pressures rather than cell or face pressures, and control volumes are dual cells around vertices of the original grid, see FIG. 9. In FIG. 9, black dots symbolize cell and node pressure unknowns, while grey dots indicate face pressure unknowns. For cell faces on interfaces separating CVFEM and MFEM regions, velocity continuity may be written in terms of node pressures, cell pressures, and face pressures. For the 2D example, illustrated in FIG. 9, the continuity equation for edge AB has the following form:

$$u_{a,CVFEM}(p_6, p_7, p_{10}, p_{11}) = u_{a,MFEM}(p_8, p_{12}, p_{13}, p_{14}, p_{15}). \quad (15)$$

In Eq. (15), the left hand side is set to be the product of permeability in cell left to edge AB and pressure gradient computed from $p_6$, $p_7$, $p_{10}$, and $p_{11}$ using CVFEM interpolation. For simplicity, the phase velocity correction for edge AB may be computed based on capillary pressure and density values on the CVFEM side. For multiphase volume balance calculations, "half" control volumes (polyhedral ADEFG in FIG. 9) are created for nodes lying on the interface. Phase flow rates for faces around half volumes are computed based on CVFEM pressure interpolation for faces in the interior of cells. For "half" faces at the interface, phase flow rates are set to be the product of phase velocity for the original grid faces and the area of the half face.

3. Transport Solve

For the pressure solve using a variable discretization method of the present invention and sequential implicit formulation, reservoir saturations are treated as fixed. The second part of a time step for multiphase flow simulation is to solve for saturations. Similar to the treatment for finite-difference based simulators, total velocity is preferably held constant during the saturation solve. This approach tends to produce more accurate solutions because it reduces at the end of the time step the discrepancy in the total volume balance equation already enforced during the pressure-solve step.

After solutions for $p_E$ and $p_s$ are obtained, values of absolute velocity, $u_a$, are recovered using the inverted mass matrix and Eq. (6). Individual phase flow rate and mass flow rate are updated according to Eqs. (7-9), with mobility again taken from the upstream side designated based on flow conditions existing at the beginning of the time step. Total flow rate, $F_t$, is then defined as $$F_t = \sum_v F_v \quad (16)$$

It is possible that phase flow may change direction after update based on pressure changes obtained from the pressure solve. In that case, values of $u_a$ and consequently the upstream direction for each phase and $F_v$ are re-determined so that a mobility upstream weighting scheme for computing $F_v$ is consistent with the sign of the actual phase flow rate, under the constraint that the total flow, $F_t$, is preserved. Similar to total flow rate, total mobility is defined as $$\lambda_t = \sum_v \lambda_v(S) \quad (17)$$

To solve for saturations, $u_a$ is first expressed as a function of saturations, treating $F_t$ as a constant $$u_a = \frac{F_t}{|\Gamma|\lambda_t(S)} - \frac{\sum_v \lambda_v \delta u_v}{\lambda_t(S)} \quad (18)$$

Substituting Eq. (18) into Eq. (8) yields expressions for phase rates as functions of saturations only $$F_v = \frac{\lambda_v(S)}{\lambda_t(S)} F_t + |\Gamma| \frac{\lambda_v(S)}{\lambda_t(S)} \left( \sum_{v'} \lambda_{v'}(S)(\delta u_v - \delta u_{v'}) \right) \quad (19)$$

Mass flow rates at constant total phase flow rate are $$\overline{U}_i = \sum_{v=1}^{\omega} \xi_{iv} F_v \quad (20)$$

Finally, constraint equations to solve for saturation are simply definitions of phase saturations $$v_v = S_v v_p \quad (21)$$

Similar to the pressure solve, linearization is performed on Eq. (21):

$$\left[ dt \sum_{s,i,v'} \left( \frac{\partial v_v}{\partial N_i} \cdot \frac{\partial \overline{U}_{s,i}}{\partial S_{v'}} \right) - \delta_{vv'} v_p \right] (S_{v'} - S_{v'}^0) = \quad (22)$$

$$S_v^0 v_p^0 - v_v^0 - dt \sum_{s,i} \left( \frac{\partial v_v}{\partial N_i} \cdot U_{s,i}^0 \right),$$

$$v = 1, \ldots, \omega - 1$$

where saturation derivatives of mass flow rates are calculated using Eqs. (19) and (20).

Figure 10:
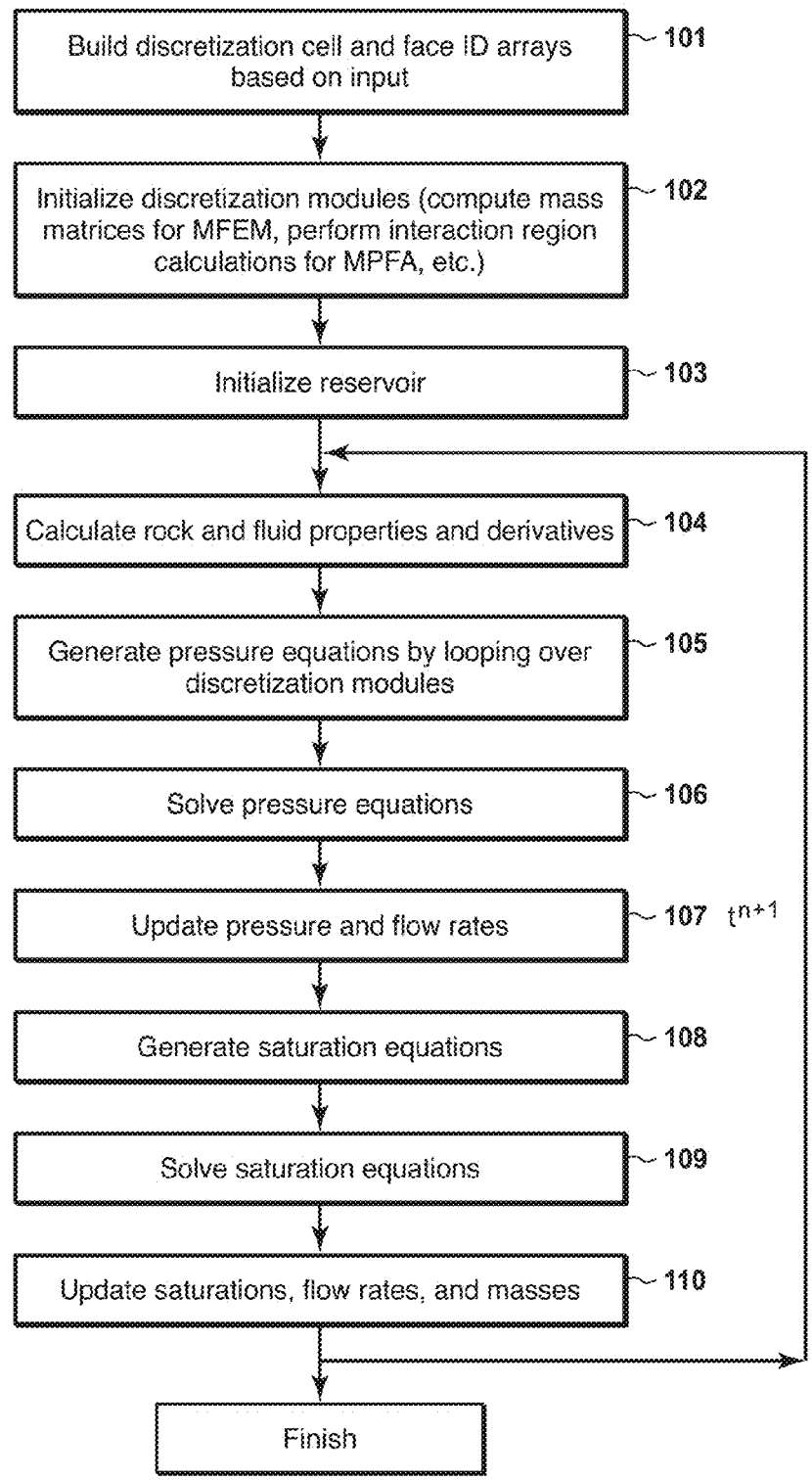
FIG. 10 is a flowchart showing basic steps in one embodiment of the present inventive method.

FIG. 10 is a flowchart showing basic steps in a reservoir simulation using the present inventive method. The improvements made to reservoir simulation by the present invention will occur primarily at steps 101, 102 and 105, although other steps are impacted. At step 101, different integer arrays containing indices of reservoir cells and cell faces belonging to different discretization regions are constructed according to either user input or internal criteria based on cell geometry and permeability properties.

At step 102, different discretization modules are initialized. Within this initialization step, computations that are not dependent on time are performed and stored in memory to be used later during time stepping. These computations include assembly and inversion of mass matrices for MFEM, solution of intermediate unknowns and calculation of fluxes for all interaction regions for MPFA, etc.

At step 103, reservoir is initialized. This step determines initial pressure, masses, and saturation conditions for each grid cell in the reservoir, typically based on gravity-capillary pressure equilibrium and specified gas-oil contact and water-oil contact. After the reservoir is initialized, time step calculations are started and repeated until simulation end time is reached.

At step 104, various rock and fluid properties as well as derivatives of those quantities necessary for simulation are computed. These include computation of relative permeability, fluid volume for each phase, phase saturations, derivative of relative permeability with respect to saturations, derivatives of phase volume with respect to masses, among others.

At step 105, different discretization modules perform calculations based on volume balance, flux continuity, etc. for the assigned regions as described in this invention to build a global linear system to be used for computing pressure unknowns.

At step 106, a solver is called to solve the pressure system. At step 107, values of pressure for each cell and flow rates between all neighboring cells are updated based on pressure solution obtained from the solver.

At step 108, a linear system is constructed based on saturation equations to solve for saturations for the time step. In the process, total phase volumetric flow between neighboring cells is held fixed to minimize volume balance errors. At step 109, the saturation equations are solved, and at step 110 flow rates and cell masses are updated based on solutions of the saturation equations. The computations then move on to the next time step (indicated by $t^{n+1}$).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. For instance, 2D examples and models are used in the foregoing description, but only for simplicity of illustration and not to limit the invention.

NOMENCLATURE $F_v$ flow rate of phase v
$F_t$ total flow rate
$\bar{F}_v$ phase flow rate computed from total velocity
$n_i$ mass of component i in the block
$U_i$ mass flow rate of component i
$\bar{U}_i$ mass flow rate of component i computed from total velocity
$\nabla$ gradient operator
$\partial$ partial derivative
$S_v$ phase saturation
$v_v$ phase volume
$v_p$ pore volume
dt time step size
$u_a$ averaged absolute velocity
$\delta u_v$ phase velocity correction
$u_v$ phase absolute velocity
K rock permeability tensor
$\lambda$ phase mobility
$|\Gamma|$ face area
$|E|$ cell volume
$\mu$ fluid viscosity
$\rho$ fluid density
p pressure
$p_{c,v}$ capillary pressure of phase v
g gravitational constant
$\zeta_{i,v}$ density of component i in phase v

SUBSCRIPTS v fluid phase index
i component index
s face index for a control volume
a averaged quantity
t total amount
c capillary

SUPERSCRIPTS 0 beginning of time step

REFERENCES

1. Aavatsmark, I., Barkve, T., Boe, O., and Mannseth, T., Discretization on non-orthogonal, quadrilateral grids for inhomogeneous, anisotropic media, *J. Comp. Phy.* 127, 1996, 2-14
2. Cai, Z., Jones, J. E., McCormick, S. F., and Russell, T. F., Control-volume mixed finite element methods, *Computational Geosciences*, 1, 1997, 289-315.
3. Chavent, G., Cohen, G., Jaffre, J., Dupuy, M., Ribera, I., Simulation of Two-Dimensional Waterflooding By Using Mixed Finite Elements, SPE Journal, 1984, 382-390.
4. Chen, Q., Wan, J., Yang, Y., Mifflin, R., A New Multipoint Flux Approximation for Reservoir Simulation, SPE 106464 presented at the SPE Symposium on Reservoir Simulation, Houston, Tex., Feb. 26-27, 2007.
5. Darlow, B. L., Ewing, R. E., Wheeler, M. F., Mixed Finite Element Method for Miscible Displacement Problems in Porous Media, *SPE Journal*, 1984, 391-398.
6. Durlofsky, L. J., and Chien, M. C. H., Development of a Mixed Finite-Element-Based Compositional Reservoir Simulator, paper SPE 25253 presented at the SPE Symposium on Reservoir Simulation, New Orleans, La., Feb. 28-Mar. 3, 1993.
7. Edwards, M. G. and Rogers, C. F., A Flux Continuous Scheme for the Full Tensor Pressure Equation, proceedings, 4th European Conference on the Mathematics of Oil Recovery, Roros, 1994
8. Ewing, R. E., and Heinemann, R. F., Incorporation of Mixed Finite Element Methods in Compositional Simulation for Reduction of Numerical Dispersion, paper SPE 12267 presented at the SPE Symposium on Reservoir Simulation, San Francisco, Calif., Nov. 15-18, 1983.
9. Fung, L. S.-K., Hiebert, A. D., and Nghiem, L. X., Reservoir Simulation with a Control-Volume Finite-Element Method, *SPERE*, August, 1992, 349-357.
10. Heinrich, B., *Finite Difference Methods on Irregular Networks*, Birkhauser, Basel (1987).
11. Hoteit, H., Erhel, J., Mose, R., Philippe, B., and Ackerer, Ph., Numerical Reliability for Mixed Methods Applied to Flow Problems in Porous Media, *Computational Geosciences*, 6, 2002, 161-194.
12. Hoteit and A. Firoozabadi, Compositional Modeling by the Combined Discontinuous Galerkin and Mixed Methods, SPE Journal, March, 2006, 19-34.
13. Nordbotten, J. M. and Eigestad, G. T., Discretization on Quadrilateral Grids with Improved Monotonicity Properties, *Journal of Computational Physics*, 203, 2005, pp 744-760.
14. Klausen, R. A., and Russell, T. F., Relationships among some locally conservative discretization methods which handle discontinuous coefficients, *Computational Geosciences*, 8, 2004, pp 341-377.
15. Verma, S. K. and Aziz, K., A Control Volume Scheme for Flexible Grids In Reservoir Simulation, SPE 37999 presented at the SPE Symposium on Reservoir Simulation, Dallas, Tex., Jun. 8-11, 1997.
16. Wheeler, M. F., Arbogast, T., Bryant, S., Eaton, J., Lu, Q., Peszynska, M., A Parallel Multiblock/Multidomain Approach for Reservoir Simulation, SPE 51884 presented at the SPE Symposium on Reservoir Simulation, Houston, Tex., Feb. 14-17, 1999.
17. Wheeler, M. F., Yotov, I., A Multipoint Flux Mixed Finite Element Method, SIAM Journal on Numerical Analysis, 44, 2006, pp 2082-2106
18. Wu, X. H., and Parashkevov, R. R., Effect of Grid Deviation on Flow Solutions, *SPE Journal*, March 2009, 67-77

The invention claimed is:

1. A method for simulating multi-phase flow in a producing hydrocarbon reservoir, comprising:
generating a model of the reservoir made up of discrete cells;
using a computer to numerically solve differential equations for pressure and for fluid saturation, by phase, for the reservoir, wherein:
a finite element discretization method ("FEM") is used for the numerical solution in at least one region of the model, and a finite difference or finite volume discretization method (collectively, "FDM") is used for remaining regions of the model, wherein at least one of the remaining regions is a neighboring region to the at least one region of the model;
wherein the flow rate computation is made in at least one FEM region using a mixed finite-element method ("MFEM") generalized to handle multiphase flow, accounting for phase equilibrium, compressibility, capillary and gravitational effects, in which an MFEM mass conservation equation for single-phase flow is replaced with a volume balance equation for multiphase flow and said phase velocity correction term, $\delta u_v$, accounts for capillary and gravity effects, and is computed using a using a modified multi-point flux approximation ("MPFA") method wherein:
an interaction region is set up around each vertex point in the FEM's grid, each such interaction region containing portions of all FEM grid cells that include the vertex point, each such portion being called a sub-interaction region;
a linear pressure function, $\delta p_v$, is found for each sub-interaction region such that the following conditions are satisfied:
(i) $\epsilon p_v = p_{c,v} - p_{c,a}$ at cell centers, where $p_{c,v}$ is capillary pressure of phase v, and $p_{c,a}$ is average value of capillary pressure;
(ii) $\delta p_v$ is continuous at centers of cell interfaces; and
(iii) for each sub-face between adjoining sub-interaction regions, $\delta u_v$ is computed from $\delta u_v = -K \sim [\nabla \delta p_v + (\rho_v - \rho_a) g \vec{z}]$ where $\rho_v$ is fluid density for phase v, $\rho_a$ is average density of the fluids, g is acceleration due to gravity constant, and $\vec{z}$ is a unit vector in z-direction, which expression for $\delta u_v$, when evaluated in each sub-interaction region, is constrained to be continuous across each sub-face in its normal direction; and
phase flow rate computation is made consistent in all regions and across interfaces between regions by decomposing each individual phase velocity into an averaged component and a correction term; and
downloading, storing in memory or other data storage, or displaying at least one of hydrocarbon saturations, flow rates, and masses, for at least one phase, at one or more locations in the model.

2. The method of claim 1, wherein FEM regions of the model employ a flexible computational grid and FDM regions employ a structured or Voronoi grid.

3. The method of claim 2, wherein at least one FEM region contains intersecting faults, pinchouts, or lies near an internal surface.

4. The method of claim 1, wherein the averaged velocity component is determined from pressure and averaged capillary pressure and other properties based on the discretization method employed, while the velocity correction term is computed using a multi-point flux approximation ("MPFA") type method, which may be reduced to TPFA for simple grid and permeability fields.

5. The method of claim 4, wherein the multi-point flux approximation type method is a two-point flux approximation ("TPFA") type method for simple grids and permeability fields.

6. The method of claim 1, wherein different regions are coupled through continuity of averaged fluxes determined using rock absolute permeability.

7. The method of claim 1, wherein the solving for pressure and for fluid saturation accounts for phase equilibrium, compressibility, capillary and gravitational effects.

8. The method of claim 1, wherein in at least one FEM region, mass conservation is used together with a volume balance equation for multiphase flow, in which phase flow rates are computed from phase absolute velocity, and phase absolute velocity is computed as a sum of an averaged absolute velocity and a correction term determined using a modified multi-point flux approximation ("MPFA") method.

9. The method of claim 8, wherein the local computation of averaged absolute velocity is based on absolute permeability but independent of relative permeability.

10. The method of claim 1, wherein fluid saturations are held fixed at assumed values during solving for pressure, and then fluid saturations are solved for.

11. The method of claim 1, wherein multiple fluid phases are considered, including liquid, vapor, and aqueous phases.

12. The method of claim 1, wherein at an interface between an FEM region and an FDM region, conditions are imposed on the phase flow rate computations such that phase velocity is continuous across the interface and that averaged absolute phase velocity is the same on the FEM side of the interface as on the FDM side.

13. The method of claim 1, wherein the flow rate computation is made in at least one FDM region using a multi-point flux approximation method ("MPFA") wherein the averaged velocity, $u_a$, is obtained by steps comprising:
setting up an interaction region around each vertex point in the FDM's grid, each such interaction region containing portions of all FDM grid cells that include the vertex point, each such portion being called a sub-interaction region;
finding a linear pressure function, $\delta p_a$, for each sub-interaction region such that the following conditions are satisfied:
(i) $p_a = p + p_{c,a}$ at cell centers, where p is pressure, and $p_{c,a}$ is average value of capillary pressure;
(ii) $p_a$ is continuous at centers of cell interfaces; and
(iii) average velocity for each sub-face between adjoining sub-interaction regions is calculated from $u_a = -K \cdot [\nabla p_a + \rho_a g \vec{z}]$, where $\rho_a$ is average density, g is acceleration due to gravity constant, and $\vec{z}$ is a unit vector in z-direction, which expression for $u_a$, when evaluated in each sub-interaction region, is constrained to be continuous across each sub-face in its normal direction.

14. The method of claim 1, further comprising using the hydrocarbon saturations, flow rates, and masses to update the model of the reservoir, and repeating the method for a next time step.

15. A method for managing production of hydrocarbons from a reservoir, comprising:
- simulating fluid flow in the reservoir using a method of claim 1; and
- managing production of hydrocarbons from the reservoir based at least in part on the simulation.

* * * * *